United States Patent
Poulin

(10) Patent No.: US 9,571,552 B2
(45) Date of Patent: Feb. 14, 2017

(54) SYSTEMS, METHODS, AND COMPUTER PROGRAM PRODUCTS FOR SELECTING CODECS TO OPTIMIZE RESOURCE UTILIZATION

(71) Applicant: Genband US LLC, Frisco, TX (US)

(72) Inventor: Eric Poulin, Pierrefonds (CA)

(73) Assignee: Genband US LLC, Plano, TX (US)

( * ) Notice: Subject to any disclaimer, the term of this patent is extended or adjusted under 35 U.S.C. 154(b) by 219 days.

(21) Appl. No.: 14/482,887

(22) Filed: Sep. 10, 2014

(65) Prior Publication Data

US 2016/0072868 A1    Mar. 10, 2016

(51) Int. Cl.
*H04L 29/06* (2006.01)
*H04W 88/18* (2009.01)

(52) U.S. Cl.
CPC ............ *H04L 65/80* (2013.01); *H04L 65/103* (2013.01); *H04L 65/1069* (2013.01); *H04L 65/605* (2013.01); *H04W 88/181* (2013.01)

(58) Field of Classification Search
CPC ...... H04L 65/00–65/80; H04W 88/16–88/181; H04W 76/00–76/023
See application file for complete search history.

(56) References Cited

U.S. PATENT DOCUMENTS

| | | | |
|---|---|---|---|
| 6,754,221 B1 | 6/2004 | Whitcher et al. | |
| 7,002,992 B1 | 2/2006 | Shaffer et al. | |
| 7,768,998 B1 | 8/2010 | Everson et al. | |
| 8,248,935 B2 | 8/2012 | Rößler | |
| 2009/0047936 A1* | 2/2009 | Kampmann | H04W 28/18 455/414.1 |
| 2010/0165889 A1* | 7/2010 | Madabhushi | H04M 3/2227 370/261 |
| 2013/0156119 A1 | 6/2013 | Poulin | |
| 2014/0348156 A1* | 11/2014 | Zheng | H04L 45/30 370/352 |

FOREIGN PATENT DOCUMENTS

WO    WO 2007/019872    2/2007

OTHER PUBLICATIONS

U.S. Appl. No. 14/134,921, entitled: Systems, Methods, and Computer Program Products for Congestion Control of Media Gateway Resources, filed Dec. 19, 2013, 24 pgs.

(Continued)

*Primary Examiner* — Nicholas Taylor
*Assistant Examiner* — Clayton R Williams
(74) *Attorney, Agent, or Firm* — Haynes and Boone LLP

(57) ABSTRACT

Embodiments provide systems, methods, apparatus, and computer program products for selecting the codecs that each endpoint will use in a call in order to optimize the utilization of at least one internal resource of a network component. The network component receives a call invite from a first endpoint that identifies available codecs. The network component determines what codecs are available to the second endpoint and determines what codec pairing will have the least impact on at least one identified internal resource of the network component. The network component sends call set-up information to the first endpoint that identifies the selected codec or list of codecs for the first endpoint, and call set-up information to the second endpoint that identifies the selected codec or list of codecs for the second endpoint.

20 Claims, 6 Drawing Sheets

(56) References Cited

OTHER PUBLICATIONS

U.S. Appl. No. 14/206,167, entitled: Systems, Methods, and Computer Program Products for Congestion Control of Media Gateway Resources, filed Mar. 12, 2014, 25 pgs.
Rosenberg et al, "An Offer/Answer Model with the Session Description Protocol (SDP)," Network Working Group, Request for Comments: 3264, Obsoletes: 2543, Category: Standards Track, Jun. 2002, 25 pgs.
F. Andereasen, "Session Description Protocol (SDP) Caopability Negotiation," Internet Engineering Trask Force, Request for Comments: 5939, Category: Standards Track, ISSN: 2070-1721, Sep. 2010, 77 pgs.

\* cited by examiner

SYSTEMS, METHODS, AND COMPUTER PROGRAM PRODUCTS FOR SELECTING CODECS TO OPTIMIZE RESOURCE UTILIZATION

TECHNICAL FIELD

The present description relates, in general, to network computer systems and, more specifically, to techniques for selecting codec pairs out of a list of available codecs offered by both endpoints of a requested communication session to optimize media resource utilization in the network computer systems.

BACKGROUND

Internet protocol (IP) networks and other types of networks can be used to carry data for different types of calls. Various types of calls include voice and video communications and conferencing, and streaming services including audio and video streaming. Audio and video data are typically encoded for transmission via these networks by one or more codecs along the way. A codec may be hardware of software used to encode and decode data, such as audio and/or video data in a signal. A media gateway/media gateway controller and/or a session border controller, located along a network path between the two endpoints, perform different types of services for the transmission of calls, including transcoding, transrating, and encryption. Often, one or both endpoints will have the option of using one of several different possible codecs with any particular kind of data.

The impact on the internal resources available to the network component varies, depending upon the codec(s) used. Depending upon which codecs are used, transcoding or other services may be necessary at the network component. As the volume of media traffic carried by communications networks continues to increase, the need for network components to provide ever greater capability to handle media traffic in a manner that more efficiently uses resources internal to network components increases as well.

BRIEF DESCRIPTION OF THE DRAWINGS

The present disclosure is best understood from the following detailed description when read with the accompanying figures.

SUMMARY

Figure 1:
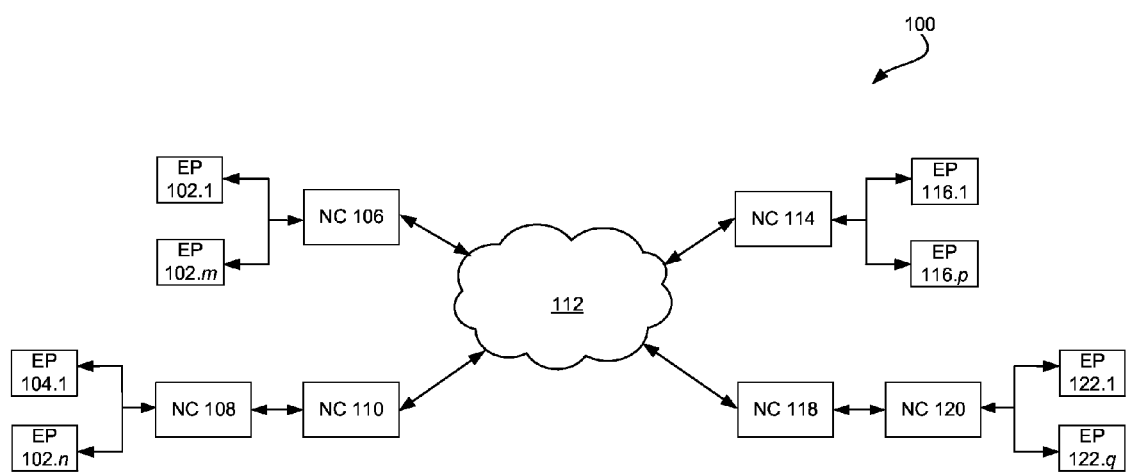
FIG. 1 is an illustration of an exemplary network architecture, according to an embodiment.

According to an embodiment, a method is performed by a network component that facilitates a communication session set-up process among endpoints in a communication network, the method including: receiving, by a transceiver of the network component, a call invite from a first endpoint directed towards a second endpoint, the call invite identifying a first plurality of codecs available at the first endpoint; determining, by a codec selector of the network component, a codec pair based at least in part on a utilization of a network component resource, the codec pair comprising a first codec from among the first plurality of codecs and a second codec from among a second plurality of codecs identified as available at the second endpoint; and transmitting, by the transceiver, call set-up information including an identification of the first codec to the first endpoint and an identification of the second codec to the second endpoint.

According to another embodiment, a network component includes: a transceiver configured to receive a call invite from a first endpoint directed towards a second endpoint, the call invite identifying a first plurality of codecs available at the first endpoint, and transmit call set-up information including an identification of a first codec to the first endpoint and an identification of a second codec to the second endpoint; a network component resource configured to assist in facilitating a communication session among the first and second endpoints; a codec selector configured to determine a codec pair based at least in part on a utilization of the network component resource, the codec pair comprising the first codec from among the first plurality of codecs and the second codec from among a second plurality of codecs identified as available at the second endpoint; and a processor configured to execute the codec selector.

According to another embodiment, a computer program product has machine-readable instructions on a non-transitory storage medium of a network component for facilitating a communication session among endpoints in a communication network, the computer program product including: code to determine a utilization of a network component resource of the network component in response to receiving a call invite from a first endpoint directed towards a second endpoint, the call invite identifying a first plurality of codecs available at the first endpoint; code to filter a second plurality of codecs based on a listing of codec preferences for the second endpoint, the second plurality of codecs being identified as available at the second endpoint; code to determine a codec pair based at least in part on the determined utilization, the codec pair comprising a first codec from among the first plurality of codecs and a second codec from among the second plurality of codecs; and code to transmit call set-up information including an identification of the first codec to the first endpoint and an identification of the second codec to the second endpoint.

DETAILED DESCRIPTION

The following disclosure provides many different embodiments, or examples, for implementing different features. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments provide techniques for a network component, for example a media gateway (MG) in combination with a media gateway controller (MGC), or a session border controller (SBC), to optimize its internal resources by controlling selection of codec pairs. Different codecs have disparate impacts on the various internal resources of a network component tasked with setting up and facilitating communication sessions between endpoints. These communication sessions are used to carry data for different types of calls, such as Voice over Internet Protocol (VoIP) calls, and video conferencing and streaming.

In an embodiment, a first endpoint sends a call initiation request towards a second endpoint. The call initiation request may include an identification of the codecs available to the first endpoint for use. The call initiation request first reaches an intermediary network component before the second endpoint. The network component may have a list of codecs available to the second endpoint, and a known impact that each codec has on at least one internal resource of the network component. The network component may also track the impact that each possible codec pairing between those available to the first and second endpoints has on at least one internal resource of the network component. This tracking may be in the form of a model used to estimate the impact, or a lookup table, or a dynamic determination at the time of receipt of the call initiation request.

When the network component receives the call initiation request, the network component may assess the current usage of each internal resource of the network component. The network component may have direct access to this information or the network component may estimate the usage, to name a few examples. The network component may, with this information, identify the internal resource, e.g. a DSP or other resource, with the highest current utilization. The network component may then prioritize the different possible codec pairings in order of least to most impact on the identified internal resource (highest to lowest priority) and select the highest priority codec pairing, or list out in order of priority, for each endpoint to use. The network component may then convey an indication of the selected codec, or prioritized codec list, to the second endpoint and, after receiving a confirmation message, convey the other selected codec/prioritized codec list back to the first endpoint. In an embodiment, the network component may reorder the list of codecs that the first endpoint identified as available based on the selection made at the network component. As the call commences, the network component may then perform transcoding and/or any other services necessary during the call. In this manner, the network component may proactively select codecs to optimize the utilization of at least one of its internal resources.

In various embodiments, the signaling plane and the media plane may be integrated in the same hardware or separated into different hardware components. For example, where the network component is a MG operating together with a MGC, the MGC may select the codec pairing and/or generate a prioritized list of codec pairings, and convey the indication of the selection to the MG for performance of transcoding. As another example, a SBC may select the codec pairing and/or generate the prioritized list of codec pairings in the signaling plane as well as perform subsequent transcoding in the media plane. Alternatively, the SBC may utilize an external device for transcoding.

FIG. 1 is an illustration of exemplary network architecture 100, according to an embodiment. Architecture 100 includes endpoints 102.1 through 102.$m$, 104.1 through 104.$n$, 116.1 through 116.$p$, and 122.1 through 122.$q$. The various endpoints communicate with each other, or other endpoints not shown, via one or more network components such as network components 106, 108, 110, 114, 118, and 120, and network 112. For example, endpoints 102.1 through 102.$m$ may communicate via network component 106 and network 112 to transmit and receive data, such as voice and/or video calls. Endpoints 102.1 through 102.$m$ may be, for example, analog or digital telephones, a session initiation protocol (SIP) proxy, or IP phones to name just a few examples. In an embodiment, the endpoints 102.1 through 102.$m$ are IP phones, in which situation the network component 106 may be a session border controller. More or fewer endpoints than those shown in FIG. 1 are also possible, as will be recognized by those skilled in the relevant art(s).

As a further example, endpoints 104.1 through 104.$n$ may be analog or digital telephones. In this embodiment, the network component 108 may be a publicly switched telephone network (PSTN) or mobile switching center (MSC), and the network component 110 may be a media gateway (MG). A MG may perform various services for a call originating from or routing to any of endpoints 104.1 through 104.$n$, such as transcoding or transrating a call between disparate networks or devices. Transcoding may refer to a conversion between different transmission and/or coding types for a call, and transrating may refer to bit-rate conversion for a call. The various network components shown in FIG. 1 are all network components with communication capabilities. The network components are not limited to any particular hardware type, but may be implemented in some embodiments using commodity servers running an operating system (e.g., Linux) with SBC, MG, and/or MGC functionality included as applications running on top of the operating system. Various embodiments may include the SBC, MG, and/or MGC functionality as computer-readable code that is executed by processors of the network components.

A call originating from any of the endpoints 102.1 through 102.$m$ or 104.1 through 104.$n$, after traversing their respective network components, then traverse the network 112. The network 112 may be any kind of network such as a Local Area Network (LAN), a cellular data network (e.g., an LTE network), the Internet, and/or the like, utilizing various types of network protocols, such as IP or asynchronous transfer mode (ATM) to name just a few examples. After traversing the network 112, the call may traverse another network component, such as network component 114, 118, or 120, similar in scope to network components 106, 108, and 110 discussed above, before reaching an endpoint such as one from among endpoints 116.1 through 116.$p$ or 122.1 through 122.$q$, similar to the endpoints 102.1 through 102.$m$ or 104.1 through 104.$n$ discussed above. Calls originating from any of the endpoints 116.1 through 116.$p$ or 122.1 through 122.$q$ may traverse the various network components and network 112 in similar manner towards any of endpoints 102.1 through 102.$m$ or 104.1 through 104.$n$.

In an embodiment, a call may originate from endpoint 102.1 directed towards endpoint 116.1. As an example, the call may be made using SIP. When using SIP, an INVITE with a Session Description Protocol (SDP) offer attached to the message from endpoint 102.1 reaches the network component 106. SDP is used for call session initialization, including negotiation of parameters for the call session. Among other things, the INVITE message may include a list of codecs available to the endpoint 102.1. Some examples of available codecs could include audio codecs such as Enhanced Variable Rate Codec (EVRC), Adaptive Multi-Rate (AMR), G.711, Internet Low Bit Rate Codec (iLBC), AMR-WB, G.729, and/or video codecs such as H.261, H.263, H.264, Moving Picture Experts Group (MPEG), or VP8, to name just a few examples of each. Codecs, such as those listed above, may have different impacts on the network component 106's internal resources, such as one or more of its DSP, bandwidth, hardware accelerator, memory, CPU, etc. The network component 106 may also have inherent limits that would prevent the network component 106 from using a given codec when a certain number of instances of the particular codec have been reached, e.g. where there are a limited number of licenses for the codec.

The network component 106 may have a list of codecs that are available to the destination endpoint 116.1. In embodiments of the present disclosure, the network component 106 determines the utilization of one or more of its internal resources, and the impact that selection of any particular codec pair between the two endpoints would have on at least the most utilized internal resource. Based on the utilization determination, the network component 106 may select the codec, or an ordered list of codecs, for each endpoint to use that minimizes the impact on at least the most utilized internal resource, as will be discussed in more detail below with respect to subsequent figures.

The network configuration and topology of architecture 100 shown in FIG. 1 is exemplary only, and may include more or fewer elements than shown in FIG. 1 and still remain within the scope and purpose of embodiments of the present disclosure.

Figure 2:
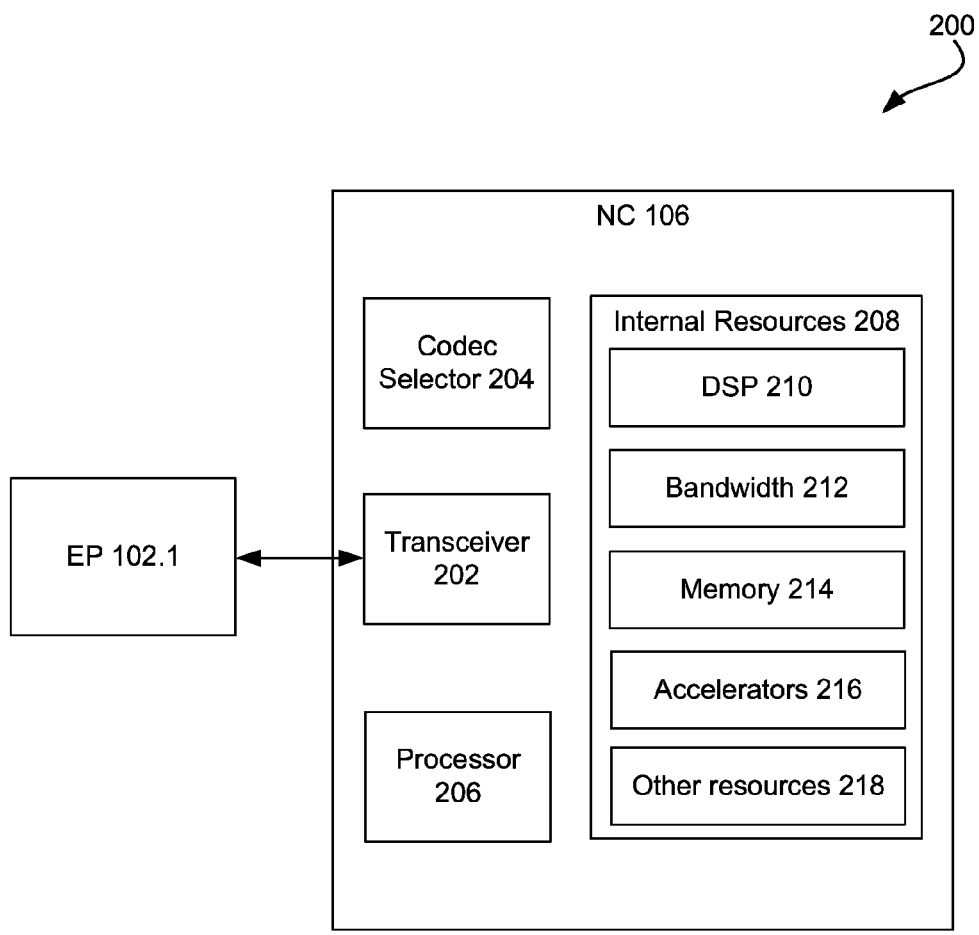
FIG. 2 is an illustration of an exemplary network computer system, according to an embodiment.

FIG. 2 is an illustration of an exemplary network computer system 200, according to an embodiment. For the sake of simplicity of discussion, network component 106 will be used, though it will be recognized that the same will be applicable to any of the other network components 108, 110, 114, 118, and/or 120. Further for simplicity, endpoint 102.1 will be used, though the following discussion is similarly applicable to any or all of the other endpoints.

Endpoint 102.1 sends a call initiation request to network component 106, for example an INVITE when SIP is used. Transceiver 202 of network component 106 may receive the INVITE. Transceiver 202 may be, for example, an Ethernet connection, a WiFi connection, or any other connection that enables the network component 106 to transmit and receive data to and from external sources, such as endpoint 102.1 and network 112. Network component 106 may also include one or more processors 206, which may each include one or more processing cores capable of performing parallel or sequential operations.

Upon receiving the INVITE from the endpoint 102.1, a codec selector 204 of the network component 106 may act to determine what codec, or codecs, will have the least impact on at least one of the internal resources 208. Internal resources 208 may include a DSP 210. DSP 210 may, for example, be used for calls that require transcoding. With respect to embodiments of the present disclosure, DSP 210 is described as an internal resource because it represents, for example, a finite amount of processing power, e.g. a number of calculations per second, available through the DSP 210's hardware. Internal resources 208 may also include bandwidth 212, for example link bandwidth available (e.g. measured in bits/second). Memory 214 may also be part of internal resources 208, for example a finite amount of RAM storage available to processing elements of the network component 106 to execution program functionality. In an embodiment, memory 214 may store a codec profile for one or more endpoints, for example the terminating endpoint which the endpoint 102.1 is attempting to establish a call with. Internal resources 208 may also include accelerators 216, for example one or more hardware accelerators that may be used for encryption and other security measures. The above-noted internal resources 208 are listed by way of example only. As will be recognized, fewer than the above may exist in any particular network component, or more as illustrated by other resources 218, or any sub-combination of the above.

After determining what codec or codecs will have the least impact on at least one of the internal resources 108, such as the resource with the highest utilization, the codec selector 204 may select that codec(s) having the least impact and transmit an indication of the selected codec(s) to each endpoint, for example by way of the transceiver 202. Once the endpoints have acknowledged the codec selections, the endpoints may communicate with each other. In embodiments where each endpoint uses a different codec than the other, for example because that selection represents the least impact on the at least one internal resource of the network component 106, the network component 106 may transcode each message as it transits the network component 106. In an embodiment, the DSP 210 performs the transcoding between endpoints. Alternatively, the network component 106 may inform and/or manage another network element, such as another network component, in transcoding between endpoints.

Figure 3:
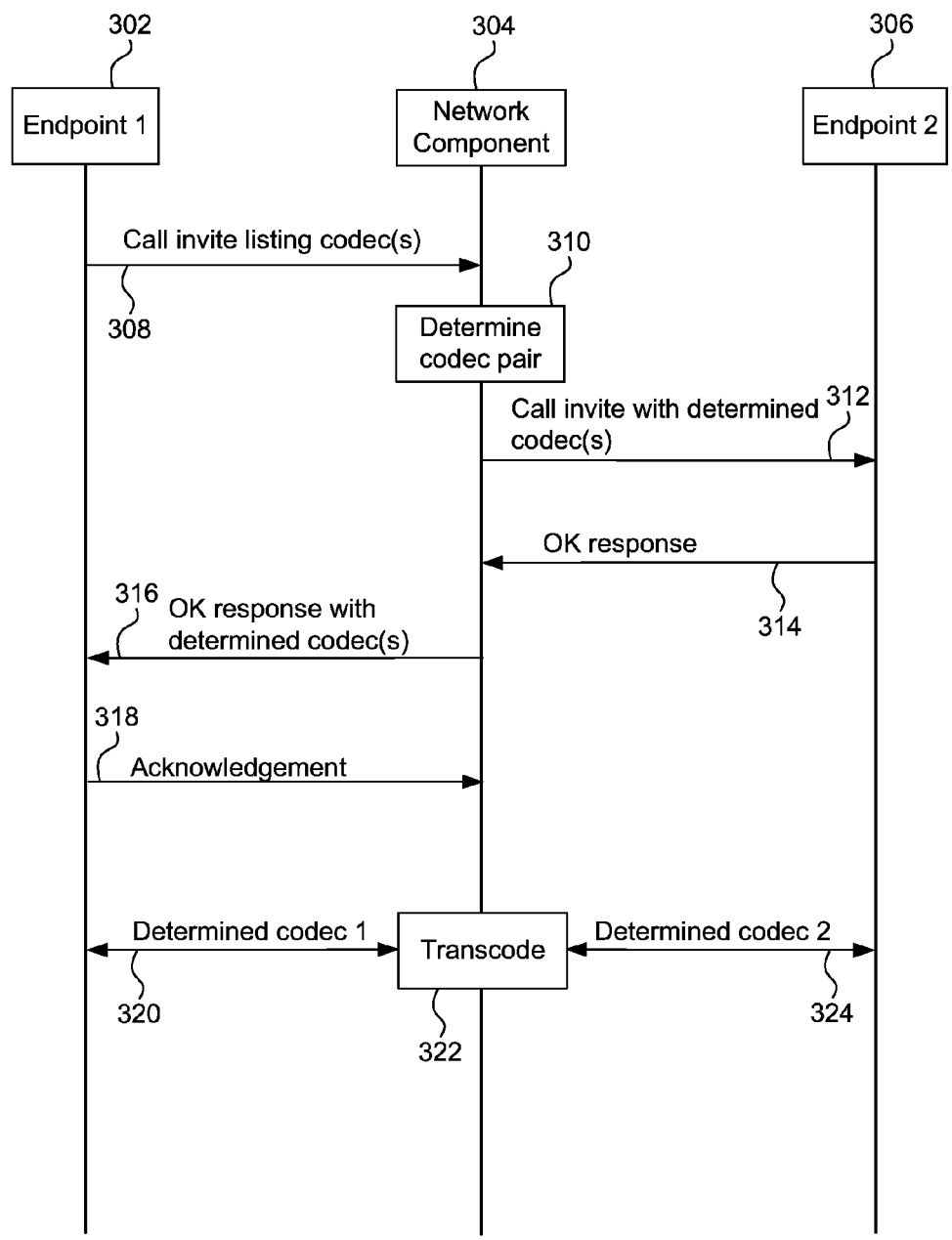
FIG. 3 illustrates an example signal diagram showing an exchange of information between a first endpoint, a network component, and a second endpoint, according to an embodiment.

FIG. 3 illustrates an example signal diagram 300 showing an exchange of information between a first endpoint 302, a network component 304, and a second endpoint 306, according to an embodiment. In FIG. 3, endpoint 302 communicates with endpoint 306 using SIP via the network component 304, although other embodiments using other appropriate protocols and techniques may be used as will be recognized by those skilled in the relevant art(s). Endpoint 302 may be an example of endpoint 102.1, network component 304 may be an example of network component 106, and endpoint 306 may be an example of endpoint 116.1, to name just one non-limiting example.

Endpoint 302 initiates a requested exchange of information by transmitting an INVITE 308 to the network component 304. The invite is intended to initiate a call with endpoint 306 via network component 304. The INVITE 308 may include a variety of information, including a listing of the codec or codecs available at the endpoint 302. As just one example for purposes of illustration, the endpoint 302 may have EVRC, G.711, and AMR 12.2 as available codecs. In compliance with SIP RFC 3264, the endpoint 302 may offer the available codecs to the network component 304 in order of most to least preferred. In this example, that would mean EVRC is most preferred by endpoint 302, followed by G.711 and then AMR 12.2.

The network component 304 determines the codec pair that should be used by each endpoint so as to minimize the impact to the network component's internal resource(s) at block 310. The network component 304 may maintain a codec profile for endpoint 306, which constitutes a list of the available and/or preferred codecs for the endpoint 306. In addition, the network component 304 may also maintain a codec profile for endpoint 302. For purposes of discussion here, as just one example the endpoint 306 may have G.729 and G.722.2 available. Availability may indicate that only those codecs are available and/or supported, or that other codecs are prohibited or not favored.

In an embodiment, the network component 304 may maintain or have access to estimates of the impact that each codec has on the various internal resources 208 of network component 304. The data may be maintained in a database locally or remotely located, or alternatively dynamically generated by the network component 304 each time the network component 304 receives an INVITE 308. This data may assume the form of a model, matrix, or look-up table that identifies the impact on a given internal resource for each possible combination of codecs. In an embodiment, the impact may be expressed in terms of a utilization percentage with respect to overall capacity for the given internal resource. An exemplary matrix may look as indicated below in Table 1. The matrix in Table 1 includes just a few codecs for illustrative purposes only—as will be recognized, the matrix may include more (or fewer) codecs than those listed.

TABLE 1

|  |  | Codec for EP 306 | | | | |
| --- | --- | --- | --- | --- | --- | --- |
|  | From\To | G.711 | AMR 12.2 | EVRC | G.729 | G.722.2 |
| Codec | G.711 | 0 | — | — | — | — |
| for | AMR 12.2 | 1.1 | 0 | — | — | — |
| EP | EVRC | 1.6 | 2.5 | 0 | — | — |
| 302 | G.729 | 0.6 | 1.5 | 2 | 0 | — |
|  | G.722.2 | 2.1 | 3 | 3.5 | 2.5 | 0 |

Table 1 illustrates, in particular, an exemplary impact of various codec combinations on the available CPU power of the network component 304's DSP, such as DSP 210 of FIG. 2. In Table 1, the number values are in terms of percentage of CPU power available, though any other appropriate forms of expression for the impact on internal resources may be used as well. Whatever value the impact is expressed as, the value is an approximation that reasonably estimates how a given codec will be used in the conditions prevailing on the network component 304.

According to the examples in Table 1, if the codec selector 204 of the network component 304 selects G.711 as the codec for each of endpoints 302 and 306, the selection would result in approximately a zero percent impact on the available CPU power of the network component 304's DSP 210. This may be, for example, because there is no transcoding necessary at the network component 304 between different codecs. Alternatively, selection of AMR 12.2 as the codec for the endpoint 302 and G.711 as the codec for the endpoint 306 would result in an impact of 1.1% on the available CPU power of the DSP 210, for example due to transcoding. Further, selection of EVRC for endpoint 302 and AMR 12.2 for endpoint 306 would result in a 2.5% impact, and so forth with the remaining row and column combinations listed in Table 1. According to the information in Table 1, the lowest impact is for any codec pair selection where both codecs are the same—a 0% impact—and the highest impact is the selection of G.722.2 as the codec for endpoint 302 and EVRC as the codec for endpoint 306. Similar calculations, for example expressed in the same manner as Table 1, may exist or be calculated upon demand for every other internal resource of the network component 304. In an example, data structures similar to Table 1, addressing each internal resource, may be stored in non-volatile memory of the network component 304 and accessed by a processor of that network component.

Returning to block 310 of FIG. 3, the codec selector 204 proceeds with determining what codec pair to select by assessing the current utilization of the internal resources 208. The assessment may include determining what the latest usage of each internal resource is, for example in relation to the maximum capacity of each respective internal resource. In an embodiment, the utilization information for each internal resource may be directly available to the codec selector 204. In an alternative embodiment, the information may not be directly available, in which case the codec selector 204 may attempt to infer the current utilization information for the internal resources.

Based on the current utilization of the internal resources 208, the codec selector 204 identifies the internal resource with the highest current utilization (actual or estimated). For example, the codec selector 204 may consider all of the internal resources 208 for the network component 304. Alternatively, the codec selector 204 may consider a subset of the internal resources 208, for example only those internal resources identified to be of particular interest for avoiding a congestion state. As just one example, if the DSP 210 of the network component 304 has a current utilization of 50% of overall capacity, while the bandwidth 212 has a current utilization of 20% of overall capacity, the codec selector 204 may proceed with codec selection that will optimize DSP 210's utilization. Alternatively, the codec selector 204 may identify more than one resource that it will attempt to optimize with codec selection, for example by considering a weighted contribution of each resource's utilization. Additional criteria may also be considered beyond resource utilization, including voice quality, video quality, and least cost, to name just a few examples. The codec selector 204 may be instructed to determine what resource to optimize based on any one of these factors, or some combination of the factors such as a weighted combination of the factors.

Still with respect to block 310, with the internal resource identified for optimization, the codec selector 204 proceeds with codec selection for each of the endpoints 302 and 306. For simplicity of discussion, it is assumed that the DSP 210 has been identified as the most utilized resource and Table 1 is a representation of the utilization impacts of each possible codec pair on the DSP 210. Based on the information in Table 1, the codec selector 204 will select the codec pair of G.711 for endpoint 302 and G.729 for endpoint 306 because it represents the least impact on the DSP 210 from among the available codecs at each endpoint, 0.6%. The codec selector 204 may also identify, in order of priority, the next best codec option for each endpoint.

After the codec pair has been selected, the network component 304 modifies the INVITE 308 and transmits it as INVITE 312 to the endpoint 306. The modification involves changing the INVITE with the codec listing for endpoint 306 to reflect what the codec selector 204 determined to have the least impact on the internal resource, in this example being G.729 followed by G.722.2 in order of priority (most preferred being first, here G.729). For example, the first codec offered in the SDP "m=" line toward endpoint 306 may include G.729, the codec with least impact. In embodiments where some other type of signaling other than SIP is used, the network component 304 may attempt to prioritize the codecs with least impact according to any rules defined in the standard used to prioritize codecs for the type of signaling used. In an embodiment, the network component 304 may include the full prioritized list of codecs in the same INVITE 312.

After the endpoint 306 receives the INVITE 312, the endpoint 306 transmits the 200 OK 314 back to the network component 304, indicating acknowledgement of the selected codec(s) according to SIP. If another protocol were used, the endpoint 306 may acknowledge the selected codec(s) according to that protocol.

In an alternative embodiment, the network component 304 may include an indication of each codec in a separate INVITE 312 to the endpoint 306, beginning with the highest priority (e.g. least impact) codec. If the endpoint 306 were to reject the first offered codec, the network component 304 would then send an indication of the next best codec in order of priority to the endpoint 306. This process would repeat until the endpoint 306 provides the 200 OK 314 in response or the call is dropped.

After the network component 304 receives the 200 OK 314 from the endpoint 306, the network component 304 transmits the 200 OK message 316 to the endpoint 302. Continuing with the particular example using exemplary Table 1, the network component 304 first rearranges the codec list so that the most preferred codec which has the least impact on the identified internal resource, G.711 in this example, is listed first. As a result, though the original message from endpoint 302 listed EVRC followed by G.711 and then AMR 12.2, the network component 304 rearranges so that the 200 OK message 316 lists G.711 first, followed by the other two in descending order of determined priority.

The endpoint 302 acknowledges receipt of the 200 OK message 316 with an acknowledgement signal 318 back to network component 304. The endpoints 302 and 306 then set up a call stream and exchange signals 320 and 324, respectively, via the network component 304. Where the network component 304 selected different codecs for each endpoint to constitute the codec pair, the network component 304 transcodes each message between the codecs, for example using DSP 210. In this particular example, that would involve receiving signal 320 from endpoint 302 that has been encoded using G.711, transcoding the message to become signal 324 encoded using G.729, and transmitting it to endpoint 306 (and vice versa). In an alternative embodiment, the network component 304 may inform and/or manage another network component for transcoding.

Figure 4:
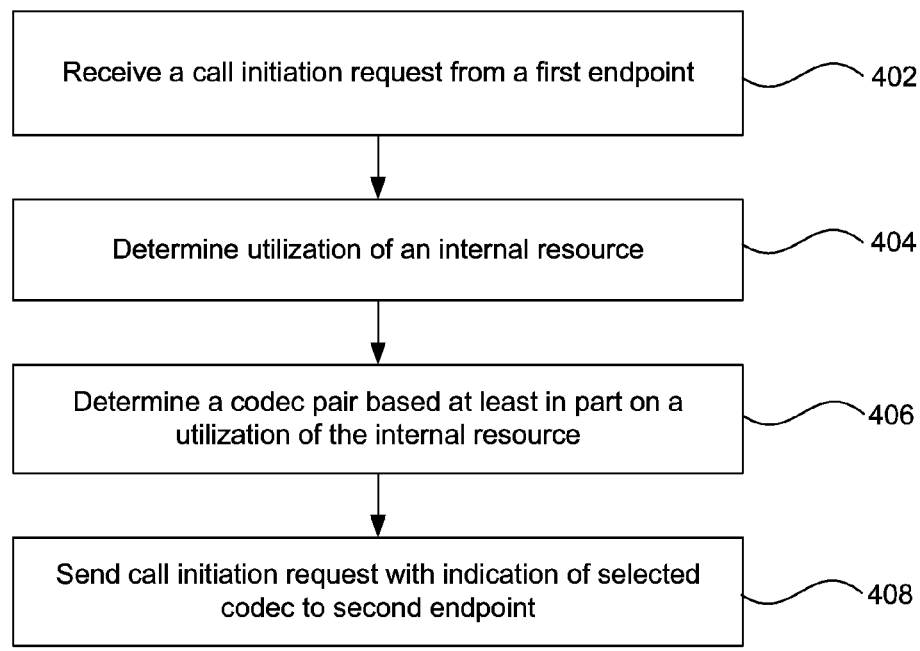
FIG. 4 is a simplified block diagram of an example method, according to an embodiment.

FIG. 4 is a simplified block diagram of an example method 400 for selecting codecs in order to optimize utilization of at least one internal resource, according to an embodiment. For simplicity, the following discussion will be with respect to endpoints 302 and 306 and network component 304 discussed above with respect to FIG. 3. In an embodiment, method 400 may be performed by network component 304. For example, a computer providing network component functionality may read executable code from a non-transitory medium and then execute the code to perform the actions described below.

At action 402, the network component 304 receives a call initiation request from a first endpoint, such as endpoint 302. The call initiation request may be formed according to any appropriate protocol, and may include an identification of codecs available to the endpoint 302.

At action 404, the network component 304, for example by way of the codec selector 204 described in FIG. 2, determines the utilization of an internal resource, or some or all internal resources of the network component 304, which is used to identify the internal resource of network component 304 with the highest utilization at that time.

At action 406, the network component 304, for example by way of the component selector 204, determines a codec pair to use at each endpoint based at least in part on the utilization determined at action 404. The codec pair reflects the combination of codecs that, when used respectively by each endpoint, will result in the least impact on utilization (or other criteria used to prioritize codecs) of the identified internal resource of the network component 304.

At action 408, the network component 304 forwards the call initiation request, originally received from endpoint 302, on to the second endpoint, such as endpoint 306. The network component revises the codec listing in the call initiation request as necessary to reflect a prioritized list of possible codecs for the endpoint 306.

Figure 5:
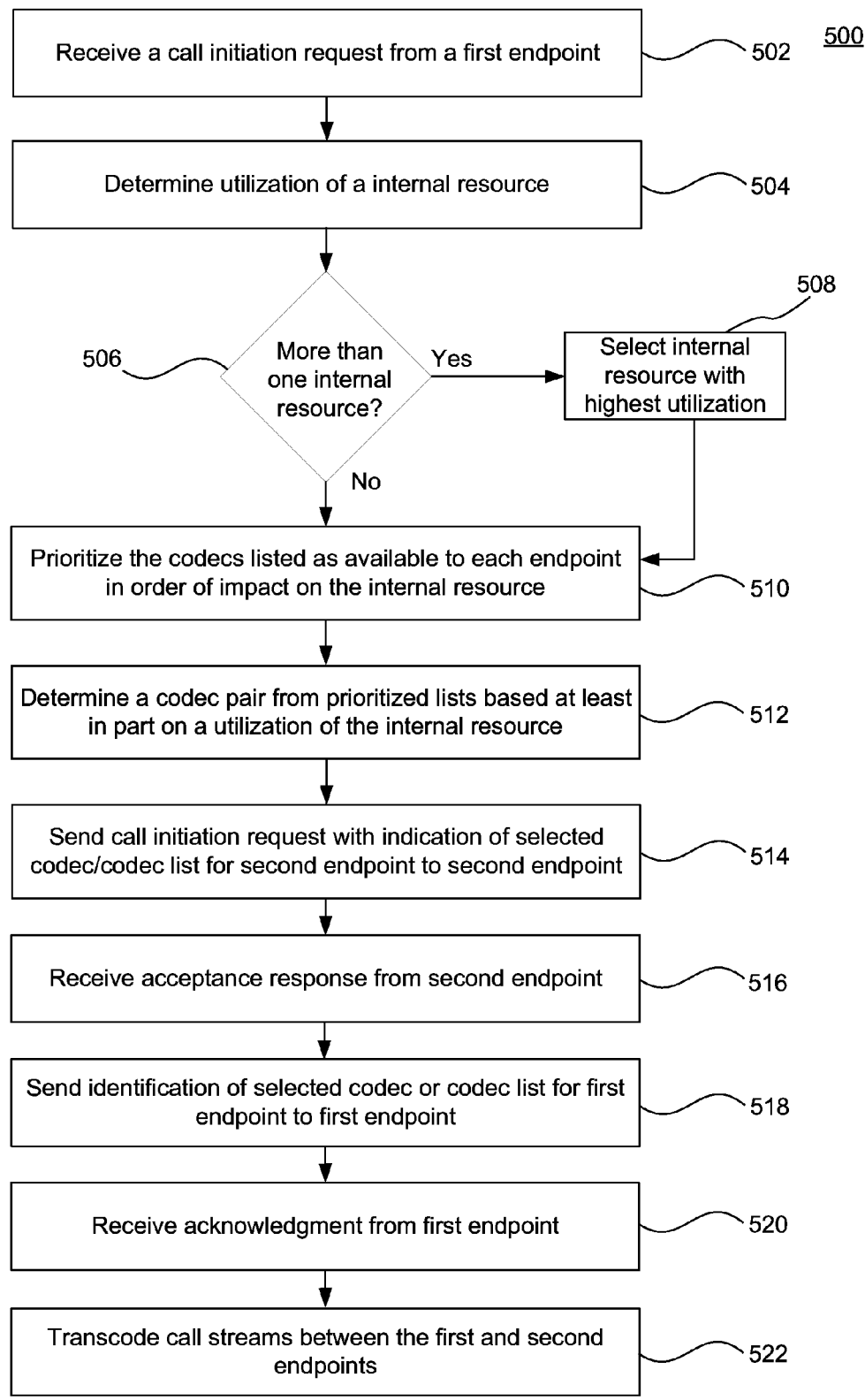
FIG. 5 is a simplified block diagram of an example method, according to an embodiment.

FIG. 5 is a simplified block diagram of an example method 500 for selecting codecs in order to optimize utilization of at least one internal resource, according to an embodiment. Method 500 discusses several actions described above in FIG. 4 in more detail.

At action 502, the network component 304 receives a call initiation request from the endpoint 302 that identifies a list of codecs available to the endpoint 302 in order of priority.

At action 504, the network component 304, for example by way of the codec selector 204, determines a utilization of an internal resource. As discussed above, this may involve either obtaining the information from a source that is directly available, or estimating the utilization based on whatever information is available.

At decision action 506, the network component 304 determines whether there are any other internal resources. If so, the network component 304 determines the utilization for the remaining internal resources and proceeds to action 508. At action 508, the network component 304 compares the utilization values of each of the internal resources to the others and selects the internal resource with the highest utilization value. As discussed above with respect to FIG. 3, the selection may alternatively be made based on multiple criteria.

The method 500 proceeds from action 508 to action 510, or if the result of decision action 506 is no, from decision action 506 to action 510. At action 510, the network component 304, for example by way of the codec selector 204, prioritizes the codecs listed as available to each endpoint in order of impact on the selected internal resource. Prioritization may be made possible due to maintenance of a lookup table or matrix that identifies the amount of impact each codec pair has on the internal resource, or due to active computation of the different impacts around the time of the call initiation request. In addition, the network component 304 may filter any codecs that, though listed as available for the endpoint 306, may nonetheless be prohibited or not favored for the particular type of call or endpoint.

At action 512, the network component 304, for example by way of the codec selector 204, determines a codec pair based at least in part on an impact to the selected internal resource determined at action 510. The determined codec pair represents the codec for each endpoint that, when used together, results in the least impact on the internal resource. The network component 304 may modify the call initiation request it originally received from the endpoint 302 with this prioritized list of selected codecs for endpoint 306.

At action 514, the network component 304, for example by way of the transceiver 202, sends the modified call initiation request with the prioritized list of selected codecs, or selected codec if there is only one available, to the endpoint 306.

At action 516, the network component 304 receives a response from the endpoint 306 that may accept or reject the call initiation request. If the call initiation request is rejected, the network component 304 may attempt a different codec list in a different modified call initiation request or drop the call attempt.

At action 518, the network component 304 passes on the response received from the endpoint 306 that accepts the call initiation request to the endpoint 302. In doing so, the network component 304 may re-arrange the original list of codecs available to the endpoint 302 based on the prioritization and determination actions 510 and 512 above, if it is different from the original list order.

At action 520, the network component 304 receives an acknowledgement from the endpoint 302.

At action 522, the network component 304, for example by way of the DSP 210, may transcode messages sent between the endpoint 302 and the endpoint 306. This occurs where the codec selector 204 determined that a combination of different codecs for each endpoint, as a pair, would result in the least impact on the internal resource at that time. The messages in this example include media streams having both media content and overhead data.

As can be seen from the discussion of the various figures above, embodiments of the present disclosure may include one more advantages over previous solutions. Some embodiments permit a more efficient use of network component internal resources on the resource level than the existing approaches. Existing solutions tend to attempt to address congestion and resource usage issues by re-routing calls to different network components within the network completely. In contrast, embodiments of the present disclosure do not require re-routing to other network components; instead, the existing network component manages its load by proactively selecting a codec pair that optimizes internal resource utilization (e.g., reduces the amount of utilization necessary for a given call).

Figure 6:
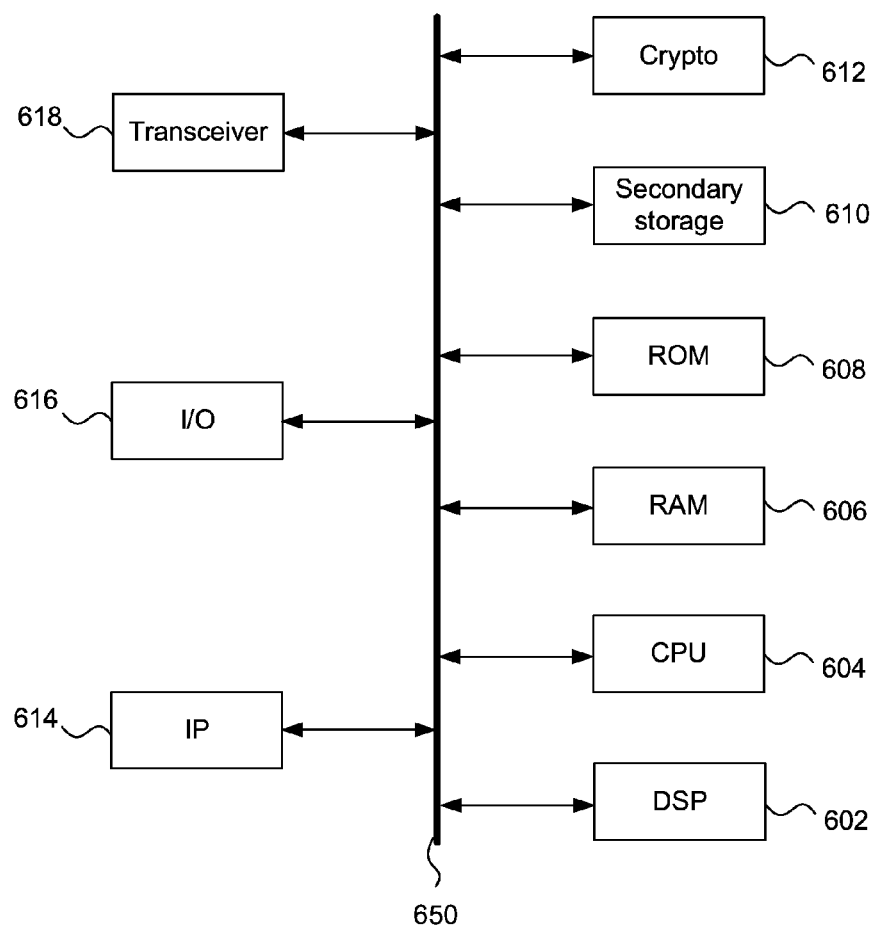
FIG. 6 illustrates an example computer system, according to an embodiment.

FIG. 6 illustrates an example computer system 600 adapted according to an embodiment of the present disclosure. The computer system 600 includes an example system on which embodiments of the present disclosure may be implemented (such as the network components and endpoints). For instance, system 600 represents an embodiment of any of the network components of FIGS. 1-3 (e.g., network components 106 and 304). The computer system 600 includes a digital signal processor (DSP) 602, a central processing unit (CPU) 604, a random access memory (RAM) 606, a read-only memory (ROM) 608, secondary storage 610, encryption and decryption resources 612 (referred to in the figure and herein as "crypto resources"), dedicated IP communications hardware 614, input/output (I/O) devices 616, and transceivers 618, all of which may be communicatively coupled via a bus 650.

The CPU 604 may be implemented using hardware or a combination of hardware and software. Although illustrated as a single CPU, the CPU 604 is not so limited and may comprise multiple processors. The CPU 604 may be implemented as one or more processors, i.e., as one or more chips, cores (e.g., a multi-core processor), field-programmable gate arrays (FPGAs), and/or application specific integrated circuits (ASICs). Likewise, the DSP 602 may be implemented as more than one DSP chip. The DSP 602 may perform transcoding or transrating of a media stream or call flow received by transceiver 618. Crypto resources 612 may include a hardware accelerator for performing security features such as encryption or authentication of a media stream or call flow received by transceiver 618.

The secondary storage 610 may comprise one or more disk drives or solid state drives and is used for non-volatile storage of data and as an over-flow data storage device if the RAM 606 is not large enough to hold all working data. The RAM 606 may be static RAM, dynamic RAM, or the like, and the ROM 608 may be programmable ROM (PROM), erasable PROM (EPROM), electrically EPROM (EEPROM), or the like. The secondary storage 610 may be used to store programs that are loaded into the RAM 606 when such programs are selected for execution. The ROM 608 is used to store instructions and optionally data that are read during program execution. The ROM 608 is a non-volatile memory device that typically has a small memory capacity relative to the larger memory capacity of the secondary storage. The RAM 606 is used to store volatile data and optionally to store instructions. Access to both the ROM 608 and the RAM 606 is typically faster than to the secondary storage 610.

The computer system 600 includes transceiver 618. There may be a transceiver 618 for each communication line (e.g., electrical or optical) coupled to the computer system 600. A transceiver 618 may be bidirectional or unidirectional, depending on the embodiment. Each transceiver 618 is adapted to couple computer system 600 to a communication link (e.g., a wired or wireless communication link). In the examples of FIGS. 1-3, transceiver 618 may couple endpoints to network components and network components to each other.

The I/O devices 616 may include a keyboard, a computer mouse, a microphone, and/or a display device for allowing a user to provide input to and receive output from the computer system 600.

It is understood that by programming and/or loading executable instructions onto the computer system 600, at least one of the CPU 604, the RAM 606, and/or the secondary storage 610 are changed, transforming the computer system 600 in part into a particular machine or apparatus having the functionality taught by the present disclosure. The executable instructions may be stored on the RAM 606 or secondary storage 610 and loaded into the CPU 604 for execution. The device functionality described above with respect to FIGS. 1-5 may be implemented as a software application running on the CPU 604 and using the RAM 606, the ROM 608, and/or secondary storage 610. Specifically, for the network component 304, its functions described with respect to FIGS. 1-5 may be implemented as a software application running on the CPU 604.

Logic may be encoded in a non-transitory computer-readable medium, such as RAM 606 and/or secondary storage 610. Such a medium can take many forms, including but not limited to, non-volatile media and volatile media. In various implementations, non-volatile media includes optical or magnetic disks, such as secondary storage 610, and volatile media includes dynamic memory, such as various types of RAM 606. CPU 604 reads application code from the readable medium and executes the code to provide the described functionality.

As can be seen from the foregoing, embodiments of the present disclosure enable the more efficient use of internal resources, such as DSP, memory, and bandwidth to name a few, of a network component such as a MG/MGC or SBC. Embodiments of the present disclosure enable a network component, for example operating as, or as part of, computer system 600 of FIG. 6, to improve its operation by optimizing its internal resources with respect to the calls the network component processes. This optimization results in calls imposing less of a burden on one or more of the internal resources, reducing the chance of congestion at any given time. Further, embodiments of the present disclosure address the technological problem of congestion and call dropping in increasingly busy networks overall by maximizing capacity at the network component processing a given call, thereby providing another tool for the network component to avoid congestion of its internal resources.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a network component that facilitates a communication session set-up process among endpoints in a communication network, the method comprising:
receiving, by the network component, a call invite from a first endpoint directed towards a second endpoint, the call invite identifying a first plurality of codecs available at the first endpoint;
identifying, by the network component, a second plurality of codecs available at the second endpoint;
determining, by the network component, a network component resource from among a plurality of network component resources with a highest utilization from among the plurality of network component resources;
determining, by the network component, an impact of each codec pair from the first plurality of codecs and the second plurality of codecs on the network component resource with the highest utilization, ranging from a codec pair with a highest impact to a codec pair with a lowest impact; and
selecting, by a codec selector of the network component, the codec pair with the lowest impact on the network component resource with the highest utilization, the codec pair comprising a first codec from among the first plurality of codecs and a second codec from among the second plurality of codecs.

2. The method of claim 1, further comprising:
prioritizing, by the codec selector, each of the first plurality of codecs and the second plurality of codecs in order of the lowest to the highest impact, in relation to each other, on the network component resource with the highest utilization.

3. The method of claim 2, wherein the selecting further comprises:
selecting a first codec subset from among the first plurality of codecs including the first codec and a second codec subset from among the second plurality of codecs including the second codec, based on the prioritized first plurality of codecs and the prioritized second plurality of codecs; and
communicating an indication of the first codec subset to the first endpoint as a first ordered list of proposed codecs, and communicating an indication of the second codec subset to the second endpoint as a second ordered list of proposed codecs.

4. The method of claim 1, further comprising:
transmitting, from the network component, call set-up information including an identification of the first codec to the first endpoint and an identification of the second codec to the second endpoint; and
transcoding, by a processor of the network component, media streams conveyed between the first and second endpoints during the communication session.

5. The method of claim 1, wherein the determining the network component resource with the highest utilization further comprises:
estimating, by the codec selector, a current utilization of the plurality of network component resources.

6. The method of claim 1 wherein the determining the network component resource with the highest utilization further comprises:
receiving, at the codec selector, from the plurality of network component resources a current utilization of the plurality of network component resources.

7. The method of claim 6, further comprising:
requesting, by the codec selector, the current utilization of the plurality of network component resources in response to receiving the call invite from the first endpoint.

8. The method of claim 1, further comprising:
communicating, from the network component, an indication of the determined codec pair to a second network component to facilitate transcoding, by the second network component, of media streams conveyed between the first and second endpoints during the communication session.

9. The method of claim 1, further comprising:
weighting, by the network component, a current utilization of each of the plurality of network component resources, wherein the determining the network component resource with the highest utilization is based on the weighted current utilization of each of the plurality of network component resources.

10. The method of claim 1, further comprising:
weighting, by the network component, a current utilization of each of the plurality of network component resources,
wherein the network component resource with the highest utilization comprises a weighted combination of one or more of the plurality of network component resources.

11. A network component, comprising:
a transceiver configured to receive a call invite from a first endpoint directed towards a second endpoint, the call invite identifying a first plurality of codecs available at the first endpoint, and transmit call set-up information including an identification of a first codec to the first endpoint and an identification of a second codec to the second endpoint;
a plurality of network component hardware resources configured to assist in facilitating a communication session among the first and second endpoints;
a codec selector configured to:
identify a second plurality of codecs, the second plurality of codecs including the second codec, available at the second endpoint;
determine a network component hardware resource from among the plurality of network component hardware resources with a highest utilization from among the plurality of network component hardware resources;
determine an impact of each codec pair from the first plurality of codecs and the second plurality of codecs on the network component hardware resource with the highest utilization, ranging from a codec pair with a highest impact to a codec pair with a lowest impact; and
select the codec pair with the lowest impact on the network component hardware resource with the highest utilization, the codec pair comprising the first codec from among the first plurality of codecs and the second codec from among the second plurality of codecs; and
a processor configured to execute the codec selector.

12. The network component of claim 11, wherein the codec selector is further configured to:
prioritize each of the first plurality of codecs and each of the second plurality of codecs in order of the lowest to the highest impact, in relation to each other, on the network component hardware resource with the highest utilization.

13. The network component of claim 12, wherein:
the codec selector is further configured to select a first codec subset from among the first plurality of codecs including the first codec and a second codec subset from among the second plurality of codecs including the second codec based on the prioritized first plurality of codecs and the prioritized second plurality of codecs; and
the identification of the first codec to the first endpoint comprises the first codec subset as a first ordered list of proposed codecs, and the identification of the second codec to the second endpoint comprises the second codec subset as a second ordered list of proposed codecs.

14. The network component of claim 11, wherein:
the plurality network component hardware resources comprise a digital signal processor (DSP) resource, an internet protocol (IP) resource, a hardware accelerator resource, and a memory resource, and
the network component comprises a media gateway.

15. The network component of claim 11, wherein the processor is further configured to transcode a media stream conveyed between the first and second endpoints based on the codec pair.

16. The network component of claim 11, wherein the codec selector is further configured to receive, from the plurality of network component hardware resources, a current utilization of the plurality of network component hardware resources.

17. A computer program product comprising machine-readable instructions on a non-transitory storage medium of a network component for facilitating a communication session among endpoints in a communication network, the computer program product comprising:
code to determine a utilization of a plurality of network component resources of the network component in response to receiving a call invite from a first endpoint directed towards a second endpoint, the call invite identifying a first plurality of codecs available at the first endpoint;
code to determine a network component resource from among the plurality of network component resources with a highest utilization from among the plurality of network component resources;
code to filter a second plurality of codecs based on a listing of codec preferences for the second endpoint, the second plurality of codecs being identified as available at the second endpoint;
code to determine an impact of codec pairs from the first plurality of codecs and the second plurality of codecs on the network component resource with the highest utilization, ranging from a codec pair with a highest impact to a codec pair with a lowest impact;
code to select the codec pair with the lowest impact to minimize an increase in the utilization, the codec pair with the lowest impact comprising a first codec from among the first plurality of codecs and a second codec from among the second plurality of codecs; and
code to transmit call set-up information including an identification of the first codec to the first endpoint and an identification of the second codec to the second endpoint.

18. The computer program product of claim 17, further comprising:
code to prioritize each of the first plurality of codecs and each of the second plurality of codecs in order of the lowest to the highest impact, in relation to each other, on the network component resource with the highest utilization; and
code to transcode a media stream conveyed between the first and second endpoints based on the codec pair.

19. The computer program product of claim 16, further comprising:
code to select a first codec subset from among the first plurality of codecs including the first codec and a second codec subset from among the second plurality of codecs including the second codec, based on the prioritized first plurality of codecs and the prioritized second plurality of codecs,
wherein the identification of the first codec to the first endpoint comprises the first codec subset as a first ordered list of proposed codecs, and the identification of the second codec to the second endpoint comprises the second codec subset as a second ordered list of proposed codecs.

20. The computer program product of claim 17, further comprising:
code to receive, from the plurality of network component resources, a current utilization of the plurality of network component resources.

* * * * *